(12) United States Patent
Campbell

(10) Patent No.: US 6,378,923 B1
(45) Date of Patent: Apr. 30, 2002

(54) HOLDING DEVICE FOR A MODULE

(76) Inventor: Pat Campbell, P.O. Box 23952, Pleasant Hill, CA (US) 95423

( * ) Notice: Subject to any disclaimer, the term of this patent is extended or adjusted under 35 U.S.C. 154(b) by 0 days.

(21) Appl. No.: 09/659,140

(22) Filed: Sep. 11, 2000

(51) Int. Cl.[7] .................................................. B25J 1/00
(52) U.S. Cl. ....................................... 294/19.1; 294/104
(58) Field of Search ........................... 294/19.1, 22, 23, 294/27.1, 28, 34, 99.1, 103.1, 104; 81/53.1, 53.11, 53.12, 487; 248/176.1, 187.1, 309.1, 310, 311.2, 313, 682, 689

(56) References Cited

U.S. PATENT DOCUMENTS

| | | | | |
|---|---|---|---|---|
| 2,716,043 A | * | 8/1955 | Baril | 294/99.1 X |
| 3,464,732 A | * | 9/1969 | Woodward | 294/19.1 |
| 3,473,837 A | * | 10/1969 | Goodman | 294/19.1 X |
| 4,089,553 A | * | 5/1978 | Frykholm | 294/19.1 |
| 5,096,244 A | * | 3/1992 | Wilson et al. | 294/19.1 |
| 5,463,918 A | * | 11/1995 | Lemieux et al. | 294/191 X |
| 5,765,453 A | * | 6/1998 | Mims | 294/19.1 X |

* cited by examiner

Primary Examiner—Johnny D. Cherry
(74) Attorney, Agent, or Firm—Theodore J. Bielen, Jr.

(57) ABSTRACT

A holding device for an external switch operated module utilizing a base member. The base member has a bottom, an end portion extending outwardly from the bottom, and a flange connected to the base member. A spring which is fastened to the base member includes an element extending outwardly from the base. The base member, bottom and end portion combine with the spring to form an open chamber. A lever is operable to exert a force on the spring member to reduce the size of the open chamber and hold the module tightly. A retainer maintains the lever-actuated force while the module is in use.

14 Claims, 2 Drawing Sheets

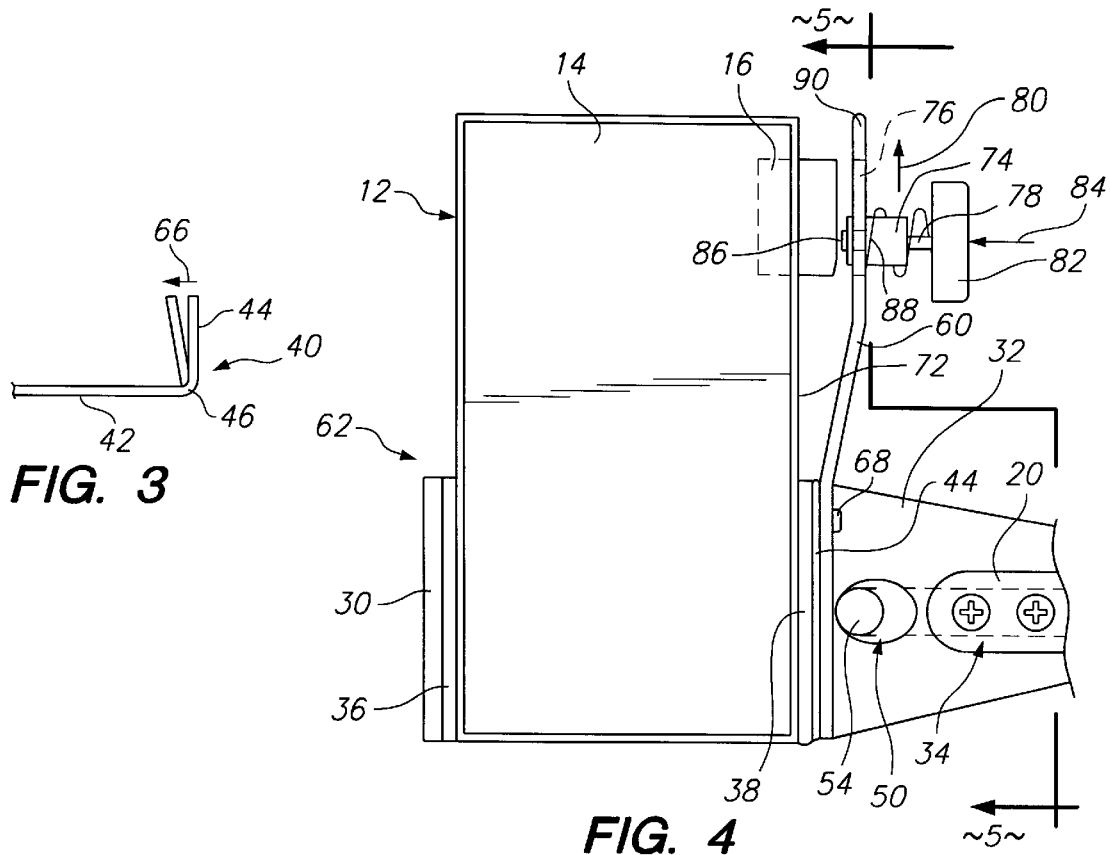
FIG. 3
FIG. 4
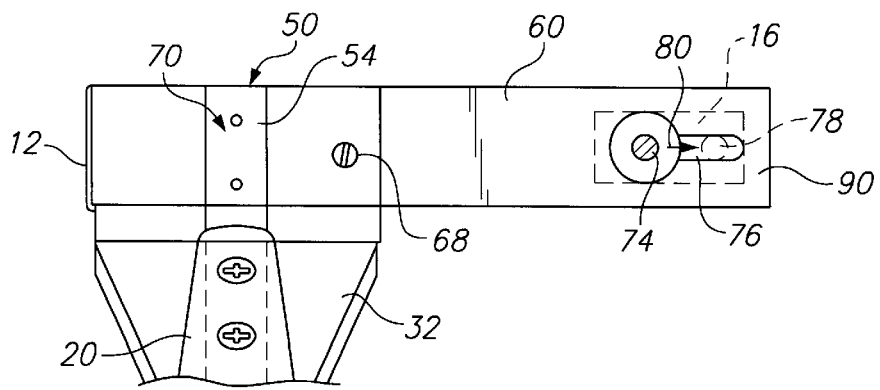
FIG. 5

HOLDING DEVICE FOR A MODULE

BACKGROUND OF THE INVENTION

The present invention relates to a novel and useful device for holding a module.

Detectors are often used to ascertain the presence of items such as electronic devices, flaws, contraband, and the like. Such detectors are packaged in self-contained housings or modules generally having an external switch to activate the same. In many cases, such modules of a sturdily constructed to prevent the release of radioactive materials. For example, a model K910B density detection device known as the "Buster" is distributed by CSECO of Pleasant Hill, Calif.

When a detection module is hand held for use in the immediate vicinity of an object, it is easily operable. However, such detectors often must be placed in the vicinity of structures that are generally out of reach of operators of the same. In the case of detection of contraband material, vehicle doors, the underside of vehicles, semi-trailer walls, vehicle roofs, and the like must be scanned with such detectors. A similar situation exists when the detector is a fiber optic inspection device, a light, a camera, a microphone, and the like. The use of such modules would then require the operator to crawl under a structure, climb a structure, or use a ladder or suitable platform, as well as other apparatuses to placed the operator in the vicinity of the object for detection. Thus, the use of detection modules is often inconvenient and sometimes dangerous.

A holding device for a passive or active module would be a notable advance in the field of remotely operated equipment.

BRIEF SUMMARY OF THE INVENTION

The present invention relates to a novel and useful holding device for a module.

The holding device of the present invention utilizes a base member having a bottom, an end portion extending outwardly from the bottom, and a flange connected to the base member. The base member may be of any rigid or semi-rigid material. The end portion may extend outwardly from the base member in a different direction from the flange.

A spring is also employed in the present invention. The spring is fastened to the base member and includes an element extending outwardly from the base. Thus, the base member bottom, base member end portion, and the spring form an open chamber for accommodating the module. The inside of the chamber may be lined with resilient material to cushion the effect of the holding device of the present invention, on the module which will be described in greater detail as the specification continues.

A lever is also employed in the present device. The lever includes a first arm, a second arm, and a fulcrum therebetween. The fulcrum is located at the base member while the first arm is movable a certain distance to effect rotation of the second arm. The second arm exerts a force on the spring element, which may be a plate, and which, consequently, decreases the size of the open chamber. In essence, the structure of the open chamber serves as a clamp to hold the module in place. Means may be employed to retain the lever in such position to hold the module in the open chamber clamp for use in a passive or active manner.

The flange connected to the bottom portion of the base member may be connected to a handle having a desired length for use in certain environments. The handle may be articulated relative to the flange and the base member in order to position the module found in the open chamber at a certain angle relative to objects associated with the use of the module.

A strip may be employed along the base member and include a protrusion which is movable relative to the strip. The strip is intended to contact an external switch on the module held in the open chamber. In this regard, the strip may possess a slot to slide the protrusion relative to the base member. The protrusion may move from a first position away from the external switch to a second position in contact with the switch. In certain cases, the strip may possess resiliency. Thus, the device of the present invention is able to support a module and maintain such module in its active state by operating an external switch.

It may be apparent that a novel and useful device for holding a module in passive or active use is herein provided.

It is therefore an object of the present invention to provide a holding device for a module for passive or active use which does not require the use of fasteners, such as screws and the like, to secure the same.

Another object of the present invention is to provide a holding device for an external switch operated module for passive or active use which is easy to operate and is capable of operating the switch of the module while manipulating the module in an environment for use.

Another object of the present invention is to provide a holding device for a module for passive or active use which eliminates the use of platforms and ladders by operators of the module.

A further object of the present invention is to provide a holding device for a module for passive or active use which securely holds the module in conjunction with an extension pole and prevents slippage of the module if the pole is shaken or banged into an object.

A further object of the present invention is to provide a holding device for a module used in a passive or active manner which eliminates the use of moving surfaces, bearings, and clamping mechanisms which may block operation of the module in its environment.

The invention possesses other objects and advantages especially as concerns particular characteristics and features thereof which will become apparent as the specification continues.

BRIEF DESCRIPTION OF THE SEVERAL VIEWS OF THE DRAWING

FIG. 3 is a side view of only the spring portion of the device depicted in FIG. 2.

FIG. 4 is a partial top plan view of the device of the present invention showing the switch operating mechanism.

FIG. 5 is a sectional view taken along line 5—5 of FIG. 4.

For a better understanding of the invention reference is made to the following detailed description of the preferred embodiments thereof which should be taken in conjunction with the prior described drawings.

DETAILED DESCRIPTION OF THE PREFERRED EMBODIMENTS OF THE INVENTION

Various aspects of the present invention will evolve from the following detailed description of the preferred embodiments of the invention which should be referenced to the hereinabove delineated drawings.

Figure 1:
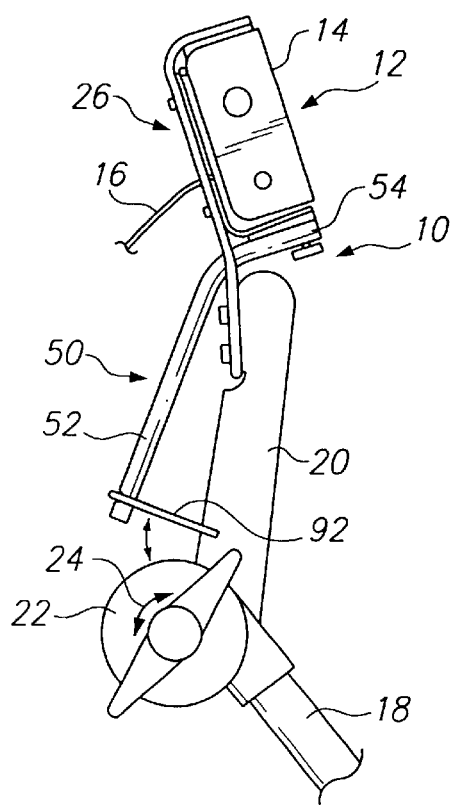
FIG. 1 is a side elevational view of the device of the present invention in use with a module.

The invention as a whole is shown in the drawings by reference character 10. Device 10, FIG. 1, is used in conjunction with a module 12 which may be a detector, light, camera, microphone, and the like. In other words, module 12 may be any active or passive device. In the present application, the detector 12 is depicted as a density measuring device used by law enforcement agencies for the detection of materials hidden behind an intervening surface, i.e., contraband. As such, module 12 is sealed and includes a surface for transmitting and receiving signals originating from a radioactive source. Thus, it is extremely important that surface 14 remain free of interference when in use. In addition, module 12 is equipped with a switch 16 that is operable on the exterior of module 12. Switch 16, of course, activates and deactivates module 12. In addition, conductors 16 are shown to indicate that information processed by module 12 may be transmitted to a remote display (not shown). As such, module 12 is located at the terminus at the extension pole 18. Extension pole 18 includes a terminal arm 20 which is articulated relative to pole 18 by the use of rotatable joint 22, of conventional configuration. Directional arrow 24 illustrates the movement of terminal arm 20 relative to extension pole 18.

Device 10 is formed with a base member 26 which is constructed of any rigid or semi-rigid material such as wood, metal, ceramic compositions, and the like. Base member 26 possesses a bottom 28, at outwardly extending end portion 30, and an angulated flange 32. Flange 32 is connected to terminal arm 20 by a plurality of fasteners 34. Resilient material pads 36 and 38 lie along base member 26.

Figure 2:
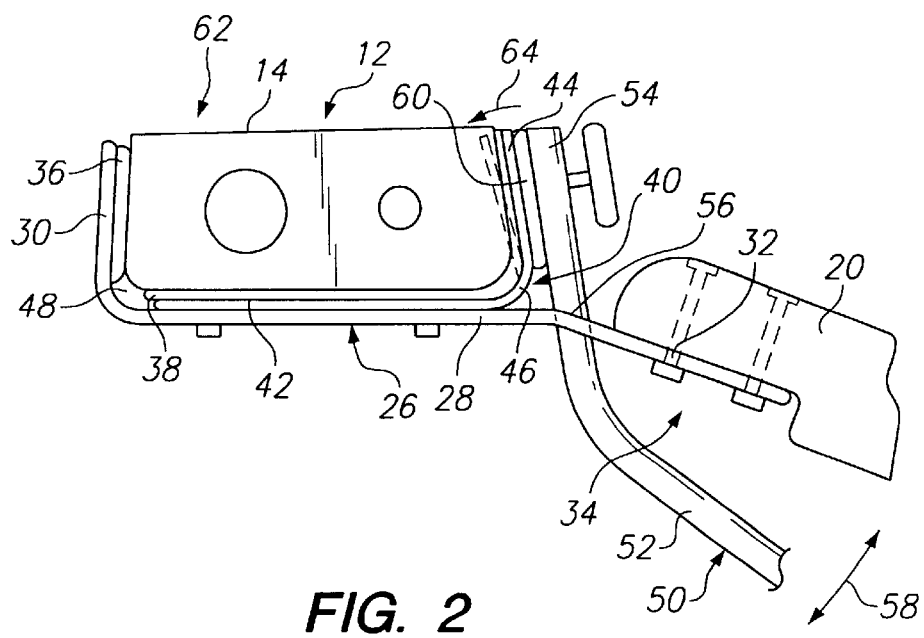
FIG. 2 is a side view of the device of the present invention showing the operation of the clamping mechanism.

Spring 40 is also employed in the present device 10, FIGS. 2 and 3. Spring 40 includes a first plate 42, a second plate 44, and a bent intermediate portion 46, therebetween. Thus, end portion 30 and bottom portion 28 of base member 26, as well as outwardly extending second plate 44 of spring 40, form an open chamber 48 which accommodates module 12. With reference to FIG. 2, it may be observed that module 12 is depicted as resting within chamber 48 adjacent resilient material strips 36 and 38.

Lever 50 is also found in device 10 and includes a first arm 52, a second arm 54, and a fulcrum 56 at base member 26, specifically at the transition between bottom 28 and flange 32. First arm 52 of lever 50 is movable according to directional arrow 58, of FIG. 2. Such movement forces second arm 54 of lever 50 against strip 60, plate 44 of spring 40, and resilient material strip 38. Such force moves spring plate 44 inwardly relative to chamber 48 as shown in FIGS. 2 and 3. Thus, the combination of spring plate 44 and relatively rigid end portion 30 of base member 26 forms a clamp 62 which holds module 12 snugly within chamber 48. The movement of spring plate 44 is illustrated by directional arrows 64 and 66 of FIGS. 2 and 3, respectively.

Strip 60 is formed of any rigid or semi-rigid material and is fastened to spring plate 44 by fastener 68, FIG. 5. Second arm 54 of lever 50 is, in turn, fastened to strip 60 by fasteners 70. Strip 60 extends along module 44 when it is held by clamp 62 within chamber 48. It may be observed that switch 16 of module 14 extends outwardly from module wall 72, FIG. 4. Strip 60 holds a protrusion 74 in a keyhole-shaped slot 76, FIG. 5. Protrusion 74 includes a narrow neck portion 78 which is capable of sliding into the smaller portion of slot 76, directional arrow 80 on FIGS. 4 and 5. To achieve such movement, a force is applied to knob 82 connected to neck portion 78 of protrusion 74 according to directional arrow 84. Such movement causes the end portion 86 of protrusion or button 74 to move against switch 16 and depress the same activating module 12. Spring 88 holds neck 78 in slot 76 narrow portion, as depicted in phantom in FIG. 5, and maintains the depression of switch 16. It should be seen that end portion 90 of strip 60 may exhibit a small degree of resiliency to permit such movement of protrusion 74 within slot 76. Thus, module is held tightly in clamp 62 and is maintained in its "on" or activated system at the same time.

In operation, the user inserts module 12 between end portion 30 of base member 26 and spring plate 44 of spring 40, adjacent resilient material strips 36 and 38. In other words, module 12 is placed within chamber 48 formed by portion 30 of base member 26, bottom 28 of base member 26 and spring plate 44. Lever 50 is then moved toward terminal arm 20 of extension pole 18 such that first arm 52 rotates about fulcrum 56 and presses spring plate 44 toward module 12, through intermediary strips 60. First arm 52 is held in this position by D-ring 92, FIG. 1, which loops over the end of lever 50. Protrusion 74 is pushed toward module 12 and slid along slot 76 such that neck 78 of protrusion 74 lies in the narrow portion of slot 76. Such movement is achieved by the grasping and pulling of knob 82, and the bending outwardly of end portion 90 of strip 60. The resultant movement inwardly of protrusion 74 is indicated according to directional arrow 84, FIG. 4. End portion 86 of protrusion 74 then contacts switch 25 and depresses the same to activate module 12. As shown in FIG. 1, module 12 surface 14 is free from blockage and may be used to detect or emanate, as the case may be. Extension pole 18 is then grasped and the angle between module 12 and the same is adjusted through articulated joint 22. Module 12 is then positioned as desired next to a structure to either transmit or receive signals. Conductors 16 transmit received signals to a remote display (not shown) in the case where module 12 is a detector.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A holding device for an external switch operated module, comprising:

a. a base member having a bottom and an end portion extending outwardly from said bottom;

b. a spring, said spring being fastened to said base member and including an element extending outwardly from said base member, said base member bottom, said base member end portion and said spring element forming an open chamber for accommodating the module;

c. a lever having a first arm, a second arm and a fulcrum, said fulcrum located at said base member said first arm being movable a certain distance for effecting rotation of said second arm to exert a force on said spring element and to decrease the size of said open chamber thereby; and d. means for retaining said lever first arm in a certain position.

2. The device of claim 1 in which said spring element comprises a plate.

3. The device of claim 1 which additionally comprises a resilient layer of material located adjacent said spring element and said end portion of said base member.

4. The device of claim 1 in which said base member further comprises a flange connected to said bottom and which additionally comprises a handle connected to said flange of said base member.

5. The device of claim 4 which additionally comprises means for connecting said handle to said flange to permit articulation between said handle and said flange.

6. The device of claim 1 in which said means for retaining said lever first arm in said certain position comprises a loop rotatably connected to said base member and movable into contact with said first arm.

7. The device of claim 1 which additionally comprises a strip extending along said base member, said strip including a protrusion extending outwardly from said strip to contact the external switch on said module.

8. The device of claim 7 in which said strip includes a slot for slidingly holding said protrusion, said protrusion being movable in said slot from a first position away from the external switch to a second position in contact with said switch.

9. The device of claim 7 in which said spring element comprises a plate.

10. The device of claim 9 which additionally comprises a resilient layer of material located adjacent said spring element and said end portion of said base member.

11. The device of claim 10 in which said base member further comprises a flange connected to said bottom and which additionally comprises a handle connected to said flange of said base member.

12. The device of claim 11 which additionally comprises means for connecting said handle to said flange to permit articulation between said handle and said flange.

13. The device of claim 12 in which said means for retaining said lever first arm in said certain position comprises a loop rotatably connected to said base member and movable into contact with said first arm.

14. The device of claim 13 in which said strip includes a slot for slidingly holding said protrusion, said protrusion being movable in said slot from a first position away from the external switch to a second position in contact with said switch.

* * * * *